United States Patent [19]

Stiefel et al.

[11] Patent Number: 4,982,602
[45] Date of Patent: Jan. 8, 1991

[54] AIR METERING DEVICE

[75] Inventors: Hans-Peter Stiefel, Ditzingen; Kurt Frank, Schorndorf-Haubersbronn, both of Fed. Rep. of Germany

[73] Assignee: Robert Bosch GmbH, Stuttgart, Fed. Rep. of Germany

[21] Appl. No.: 441,721

[22] Filed: Nov. 27, 1989

[30] Foreign Application Priority Data

Feb. 24, 1989 [DE] Fed. Rep. of Germany ....... 3905746

[51] Int. Cl.$^5$ .......................... G01F 1/68; G01M 15/00
[52] U.S. Cl. .................................. 73/118.2; 73/202.5
[58] Field of Search ............................. 73/202.5, 118.2

[56] References Cited

U.S. PATENT DOCUMENTS 4,210,016 7/1980 Peter et al. .
4,280,360 7/1981 Kobayashi et al. .
4,317,365 3/1982 Lauterbach .
4,395,907 8/1983 Morita et al. .
4,420,972 12/1983 Kuroiwa ........................ 73/202.5 X
4,624,134 11/1986 Nagano .............................. 73/118.2

FOREIGN PATENT DOCUMENTS 0054887 6/1982 European Pat. Off. .

Primary Examiner—Herbert Goldstein
Attorney, Agent, or Firm—Edwin E. Griegg

[57] ABSTRACT

An air flow meter that includes a filter or flow rectifier disposed in a retaining aperture of a collar in a bypass channel such that a second end face of the filter rests against one end of a slide-in member in which a resistance element is held in position without any edges that disturb the air flow in the remainder of the bypass channel. The air metering device is designed to be used to measure the air sucked into an air intake tube of an internal combustion engine.

10 Claims, 1 Drawing Sheet

AIR METERING DEVICE

BACKGROUND OF THE INVENTION

The present invention relates to an air flow metering device set forth herein. EP Patent No. 54 887 describes an air metering device wherein a section of the bypass channel is formed by a tube which has an air flow rectifier mounted therein and which is inserted in the flow channel casing in such a way that the air flow rectifier ends upstream of a temperature-dependent measuring resistance mounted in the bypass channel. This configuration not only results in increased costs because the air flow rectifier is either inserted in the tube in a press-fitting arrangement or it is held in place by additional fastening elements to prevent it from falling out but also the end of the tube in the bypass channel forms an airflow-disturbing edge producing eddy currents which are detected by the resistance and result in distortion or static in the measurement signal.

OBJECT AND SUMMARY OF THE INVENTION

An advantage of the airflow metering device as defined herein provides in a simple manner, in addition to the main flow channel, a bypass channel in which a filter or air flow rectifier can be easily mounted without additional fastening elements and which also eliminates the positioning of airflow-disturbing edges between the filter or air flow rectifier and the measuring resistance. This arrangement not only provides for cost-effective manufacture, reliable assembly and high dependability but also improves the measurement signal by reducing static.

Additional features and improvements on the air metering device are described hereinafter.

A slide-in housing is preferably provided with a retaining depression in alignment with a retaining aperture in a collar of the flow tube. The filter or air flow rectifier projects into the retaining depression with its second end face resting on the bottom face of the depression such that during assembly, the filter or flow rectifier can be inserted therein, centered with respect to the bypass channel section in the slide-in housing, and can be held there until the flow tube ca also be inserted from above into the main flow channel mounting element and grip the other end of the filter or air flow rectifier.

It is particularly advantageous for the section of the bypass channel formed in the slide-in unit to narrow down from the region of the filter or air flow rectifier to the temperature-dependent measuring resistance, thereby avoiding any sudden measurement-distorting flow change by reducing the pressure gradients of the airflow as the air flow approaches the measuring resistance.

BRIEF DESCRIPTION OF THE DRAWING

The drawing shows a simplified embodiment of the invention which will be described in more detail hereinafter.

DESCRIPTION OF THE PREFERRED EMBODIMENT

Figure 1:
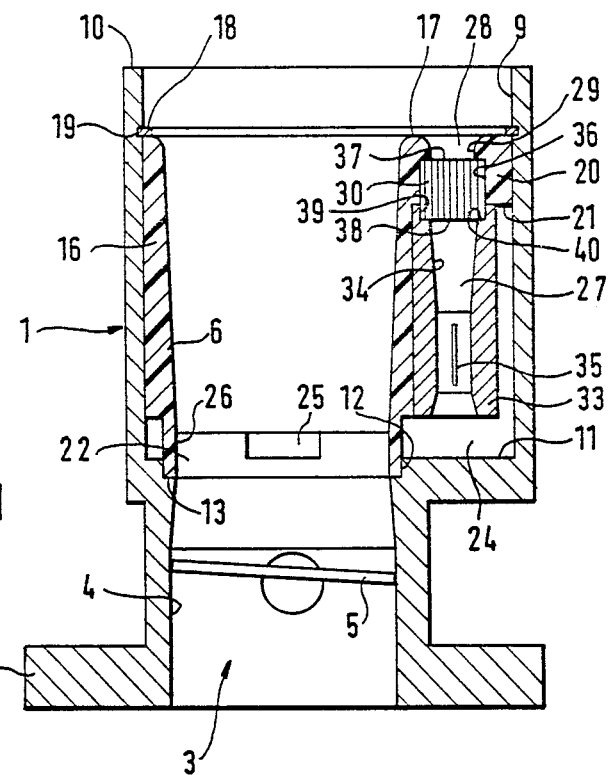
FIG. 1 is a sectional view of a throttle valve member according to the invention comprising an air metering device.
Figure 2:
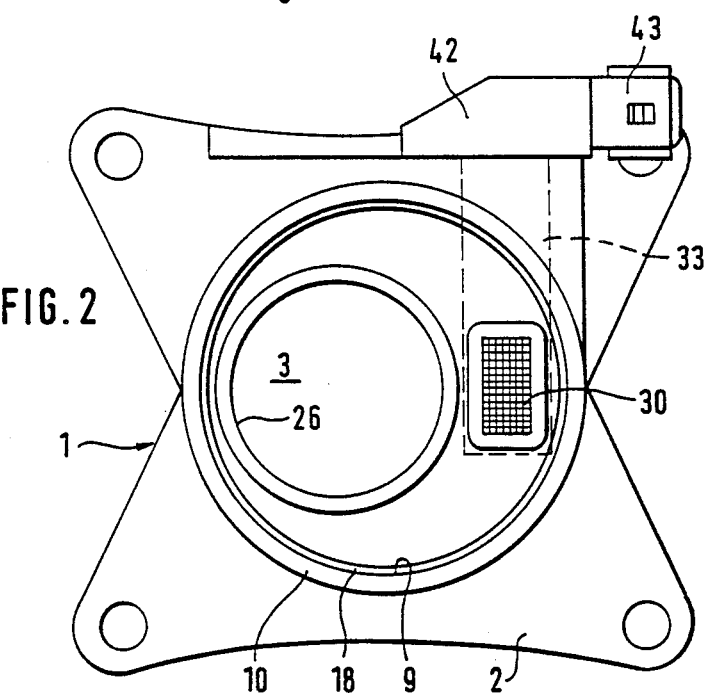
FIG. 2 is a plan view of the throttle valve member shown in FIG. 1.

A main flow channel member 1 shown in FIGS. 1 and 2 comprises a so-called throttle valve member of an internal combustion engine. This throttle valve member forms a portion of the air intake tube of the engine and is attached by means of a flange 2 and screw connections (not shown) to a collecting intake tube of the engine. The main flow channel member 1 encloses a main flow channel 3 which, in the region of the flange 2, comprises a cylindrical flow passage 4 having a throttle valve 5 mounted therein and, upstream of the cylindrical flow passage 4, comprises a Venturi-shaped flow passage 6. Upstream of the cylindrical flow passage 4, there is provided in the main flow channel member 1, eccentrically with respect to the Venturi-shaped flow passage 6, a larger diameter guide opening 9 which extends from a frontal inflow face 10 of the member 1. The frontal inflow face (10) is on an opposite end with respect to the flange 2, and the larger diameter opening 9 extends in an axial direction, as far as the bottom surface 11 provided in the main flow channel member 1. A centering opening 12 of smaller diameter than the guide opening 9 and, facing toward the throttle valve 5, ending at an abutment face 13, extends in the direction of the flow passage 4 concentrically with respect to the latter. A flow tube 16 which extends concentrically with respect to the flow passage 4, which comprises the Venturi-shaped flow passage 6 and which may be made specifically of plastics material, is inserted in a seal-tight manner in the guide opening 9 and the centering opening 12 of the main flow channel member 1. The flow tube 16 simultaneously abuts against the abutment face 13 of the centering opening and is axially secured at its oppositely directed frontal inflow face 17 by a retaining ring 18 mounted in a annular retaining groove 19 of the main flow channel member 1. A centering opening 12 of smaller diameter than the guide opening 9 and, facing toward the throttle valve 5, ending at an abutment face 13, extends in the direction of the flow passage 4 concentrically with respect to the latter. A flow tube 16 which extends concentrically with respect to the flow passage 4, which comprises the Venturi-shaped flow passage 6 and which may be made specifically of plastics material, is inserted in a seal-tight manner in the guide opening 9 and the centering opening 12 of the main flow channel member 1. The flow tube 16 simultaneously abuts against the abutment face 13 of the centering opening and is axially secured at its oppositely directed frontal inflow face 17 by a retaining ring 18 mounted in a annular retaining groove 19 of the main flow channel member 1.

Extending from the frontal inflow face 17, the flow tube 16 is provided with a collar 20 which is defined on its face directed oppositely with respect to the frontal face 17 by an abutment face 21. The periphery of the collar 20 is adjacent to the guide opening 9. A cylindrical end 22 of the flow tube 16 projects into the centering opening 12 and the zone between the end 22 and the collar 20 is of smaller cross-section than the guide opening 9 such that there is provided in the smaller diameter zone between the periphery of the flow tube and the guide opening 9 a space 24 which is defined at its upper part by the abutment face 21 of the collar 20 and at its lower part by the bottom face 11 of the guide opening 9. The cylindrical end 22 of the flow tube 16 comprises at least one radial outlet channel 25 which, by way of example, may have a rectangular cross-section and which leads from the free space 24 into a zone 26 of narrowest cross-section or of essentially narrowest cross-section of the Venturi-shaped flow portion 6 in the flow tube 16. A bypass channel 27 ends at the outlet channel 25. The inlet opening 28 of the bypass channel 27 is disposed on the frontal inflow face 17 of the collar 20 and thus is open in the direction of the guide opening 9 and, accordingly, upstream of the narrowest cross-sectional zone 26 of the Venturi-shaped flow portion. Adjacent to the rounded inlet opening 28 there is provided in the collar 20 a first zone 29 of the bypass channel. This zone 29 becomes a second bypass channel zone formed by a filter 30 or air flow rectifier 30. The filter 30 generally consists of a fine-mesh grid whereas the air flow rectifier 30 has a longer axial cross-section and is provided with individual flow pipes extending in the flow direction. These flow pipes may have rectangular, honey comb, round or other cross-section. The filter 30 and air flow rectifier 30 not only prevent undesirable dirt particles or other objects from entering the bypass channel 27 but they also permit flow disturbance.

A slide-in member 33 is inserted from without in the main flow channel member 1 such a manner that, resting close against the abutment face 21 of the collar 20, it projects into the free space 24 between the flow tube 16 and the guide opening 9. In alignment with the first zone 29 of the bypass channel 27 there is provided in the slide-in member 33 adjacent to the second zone a third bypass channel zone 34 which, at its oppositely directed end with respect to the collar 20, is open to the free space 24 and into which projects a temperature-dependent measuring resistance 35. The measuring resistance 35 may be conventionally formed as a heating wire or as a hot film resistance applied to a substrate. The third zone 34 of the bypass channel 27 is preferably narrowed down from the second zone in the direction of the measuring resistance 35 for the purpose of stabilizing the flow and obtaining a negative pressure gradient and hence an undistorted measurement signal. U.S. Pat. No. 4,317,365 describes a similar channel configuration and is thus unnecessary to provide further explanation at this point. The filter 30 or flow rectifier 30 is preferably mounted without additional fastening or retaining means in the collar 20 and in the slide-in member 33. It is also preferable that there is no airflow-distorting edge disposed downstream of the filter 30 or air flow rectifier 30 before ahead of the temperature-dependent measuring resistance 35, thereby improving the measurement signal by reducing so-called static at the temperature-dependent resistance 35. The filter 30 or air flow rectifier 30 is retained by means of a retaining opening 36 in the collar. A first end face 37 of the filter 30 or air flow rectifier 30 abuts against the end of the retaining opening 36. The filter 30 or air flow rectifier 30 is preferably sufficiently long in its axial extension that it projects at least as far as the abutment face 21 of the collar and that its second end face 38 thus comes to rest against the slide-in member 33. In alignment with the retaining opening 36 in the collar 20 there is preferably provided in the slide-in member 33 a retaining depression 39 against the bottom face 40 of which rests the second end face 38 of the filter 30 or air flow rectifier 30. It is possible during assembly of the air flow metering device to first insert the slide-in member 33 into the main flow channel member 1. The filter 30 or air flow rectifier 30 can be reliably secured in the retaining depression 39 of the slide-in member 33. Thereafter, the flow tube 16 can be inserted from above into the main flow channel member 1 in such a way that the retaining opening 36 of the collar 20 encloses the filter 30 or the air flow rectifier 30, thereby undetachably securing the filter 30 or air flow rectifier 30 in its proper position. The slide-in member 33 rests outwardly on the main flow channel member 1 by means of a support member 42 which is provided with an electrical plug 43. The present air metering device is used in a conventional manner to meter the amount of air drawn into an internal combustion engine by determining the flow rate via the temperature dependent measuring resistance 35. The air that passes through the bypass 27 flows by the temperature-dependent measuring resistance which sends a signal to a well-known processor which then sends a signal for engine operation. The air enters free space 24 and then passes through opening 25 to the main flow channel 3.

What is claimed and desired to be secured by Letters Patent of the United States is:

1. An air metering device for metering an amount of air sucked in by an internal combustion engine via an air flow tube, comprising, a main flow channel member including a main flow channel having a large diameter end portion and a small diameter end portion, a flow tube (16) inserted into said large diameter end portion and designed to form a Venturi-shaped flow zone of said main flow channel, a bypass formed between said Venturi-shaped flow zone and said large diameter end portion, said bypass including a bypass channel (27) having an inlet opening disposed upstream of a narrowest cross section of said Venturi-shaped flow zone, said bypass channel including therein, in series, in an air flow direction, a filter and a temperature-dependent measuring resistance downstream of said filter, a collar (20) that surrounds said filter in said bypass juxtaposed said inlet opening (28), said bypass channel including a first zone (29) formed in said collar (20) upstream of said filter, said bypass channel includes a second zone formed by said filter (30) and a third zone (34) formed in a slide-in member (33) which is in abutment with a downstream end of said filter and a downstream end abutment face (21) of aid collar (20); said abutment face (21) being oppositely directed with respect to the inlet opening (28) of the bypass channel (27), said temperature-dependent measuring resistance (35) being mounted in said third zone of said slide-in member (33), said filter (30) being held with its first end face (37) toward said inlet opening in a retaining opening (36) in said collar (20) in such a way that its second end face (38) directed towards said slide-in member (33) abuts against the slide-in member (33) and is axially secured by said slide-in member so that there is no airflow-distorting edge located between said second end face (38) of said filter and said temperature dependent measuring resistance (35).

2. An air metering device as claimed in claim 1, wherein said slide-in member (33) is in alignment with said retaining opening (36) in said collar (20), and includes a retaining depression (39) on an end toward said filter, into which said second end face (38) of said filter (30) projects in abutment with a bottom face (40) of said depression (39).

3. An air metering device as claimed in claim 1, wherein said third zone (34) of said bypass channel (27) narrows down from said second zone to an area in which said temperature-dependent measuring resistance (35) is secured.

4. An air metering device as claimed in claim 1, in which said flow tube (16) includes a radial opening (25) through which a bypass air flow in bypass channel (27) flows into said main flow channel.

5. An air metering device for metering an amount of air sucked in by an internal combustion engine via an air flow tube, comprising, a main flow channel member including a main flow channel having a large diameter end portion and a small diameter end portion, a flow tube (16) inserted into said large diameter end portion and designed to form a Venturi-shaped flow zone of said main flow channel, a bypass formed between said Venturi-shaped flow zone and said large diameter end portion, said bypass including a bypass channel (27) having an inlet opening disposed upstream of a narrowest cross section of said Venturi-shaped flow zone, said bypass channel including therein, in series, in an air flow direction, an air flow rectifier (30 and a temperature-dependent measuring resistance downstream of said air flow rectifier, a collar (20) that surrounds said air flow rectifier in said bypass juxtaposed said inlet opening (28), said bypass channel including a first zone (29) formed in said collar (20) upstream of said air flow rectifier, said bypass channel includes a second zone formed by said air flow rectifier (30) and a third zone (34) formed in a slide-in member (33) which is in abutment with a downstream end of said air flow rectifier and a downstream end abutment face (21) of said collar (20); said abutment face (21) being oppositely directed with respect to the inlet opening (28) of the bypass channel (27), said temperature-dependent measuring resistance (35) being mounted in said third zone of said bypass channel (27), said air flow rectifier (30) being held with its first end face (37) toward said inlet opening in a retaining opening (36) in said collar (20) in such a way that its second end face (38) directed towards said slide-in member (33) abuts against the slide-in member (33) and is axially secured by said slide-in member so that there is no airflow-distorting edge located between said second end face (38) of said air flow rectifier and said temperature dependent measuring resistance (35).

6. An air metering device as claimed in claim 5, in which said flow tube (16) includes a radial opening (25) through which a bypass air flow in bypass channel (27) flows into said main flow channel.

7. An air metering device as claimed in claim 5, wherein said slide-in member (33) is in alignment with said retaining opening (36) in said collar (20), and includes a retaining depression (39) on an end toward said air flow rectifier, into which said second end face (38) of said air flow rectifier (30) projects in abutment with a bottom face (40) of said depression (39).

8. An air metering device as claimed in claim 7, in which said flow tube (16) includes a radial opening (25) through which a bypass air flow in bypass channel (27) flows into said main flow channel.

9. An air metering device as claimed in claim 5, wherein said third zone (34) of said bypass channel (7) narrows down from said second zone to an area in which said temperature-dependent measuring resistance (35) is secured.

10. An air metering device as claimed in claim 9, in which said flow tube (16) includes a radial opening (25) through which a bypass air flow in bypass channel (27) flows into said main flow channel.

* * * * *